United States Patent [19]
Marsch

[11] 3,870,476
[45] Mar. 11, 1975

[54] DEVICE FOR PERFORMING CATALYTIC ENDOTHERMIC REACTIONS

[76] Inventor: Hans-Dieter Marsch, Wandweg 9, Dortmund-Ospel, Germany

[22] Filed: Aug. 9, 1973

[21] Appl. No.: 386,942

Related U.S. Application Data

[63] Continuation-in-part of Ser. No. 179,788, Sept. 13, 1971, abandoned.

[30] Foreign Application Priority Data
Nov. 11, 1970 Germany............................ 2055439

[52] U.S. Cl................. 23/289, 23/288 M, 122/510, 165/67, 165/160, 165/161
[51] Int. Cl............................................... B01j 9/04
[58] Field of Search . 23/289, 288 M, 288 K, 277 R, 23/277 (U.S.); 48/196 R, 196 (U.S.), 94, 95, 102, 105, 107; 196/110, 116, 133; 122/510, 511; 165/82, 82 (U.S.), 154, 154 (U.S.), 160, 161; 248/56, 58, 317

[56] References Cited
UNITED STATES PATENTS

| | | | |
|---|---|---|---|
| 2,505,696 | 4/1950 | Villiger | 165/160 UX |
| 2,518,583 | 8/1950 | Watson | 23/288 M |
| 3,257,172 | 6/1966 | Kao et al. | 23/288 M X |
| 3,274,978 | 9/1966 | Palchik et al. | 23/288 M X |
| 3,547,188 | 12/1970 | Kuhnlein | 23/288 M X |

Primary Examiner—Joseph Scovronek
Attorney, Agent, or Firm—Malcolm W. Fraser, Esq.

[57] ABSTRACT

A pressure vessel for catalytic endothermic reactions in the upper portion of which is a supporting plate for a plurality of open ended shell tubes within which are reaction tubes. The reaction tubes are spaced from the shell tubes by fins affording an annular space. The reaction tubes are either supported by the supporting plate or bear against the bottom head of the vessel through upright sleeves. Catalyst-free gas feed tubes connect to the upper ends of the reaction tubes and catalyst-free gas discharge tubes connect to the lower ends. In one form, the discharge tubes extend through the bottom head of the vessel into a heat exchanger vessel, the top wall of which is formed by the bottom head of the pressure vessel. The supporting plate is supported by detachable tie rods.

6 Claims, 9 Drawing Figures

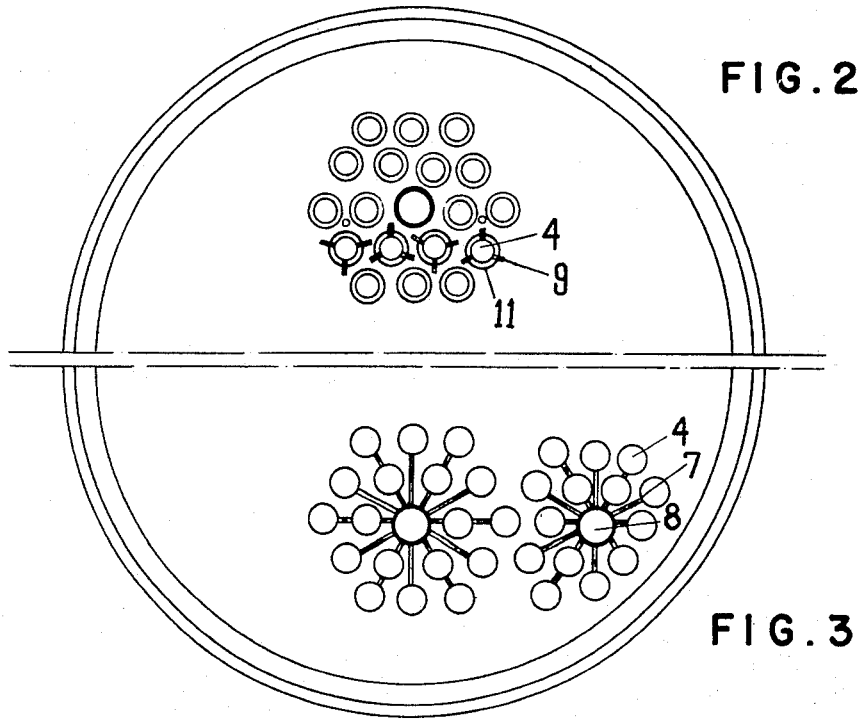

FIG.4
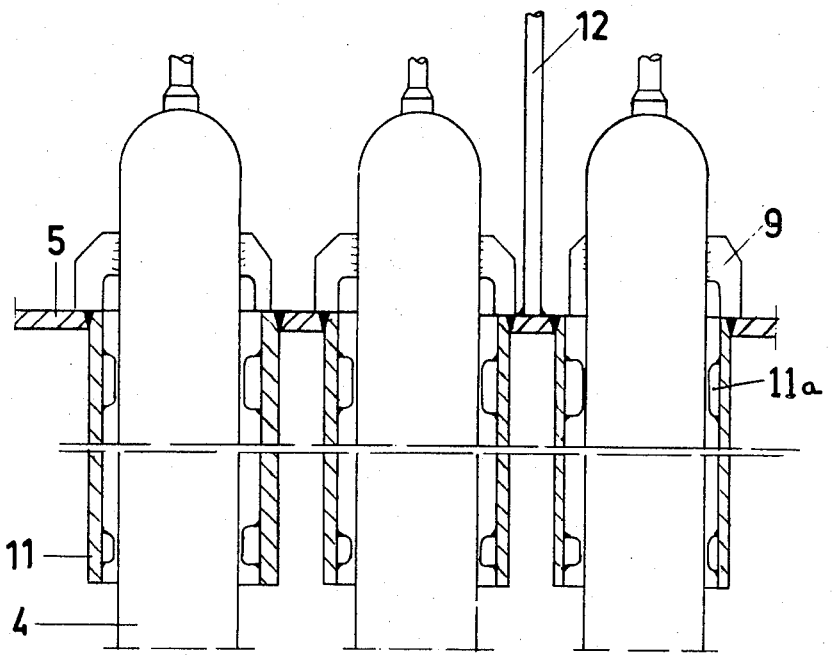
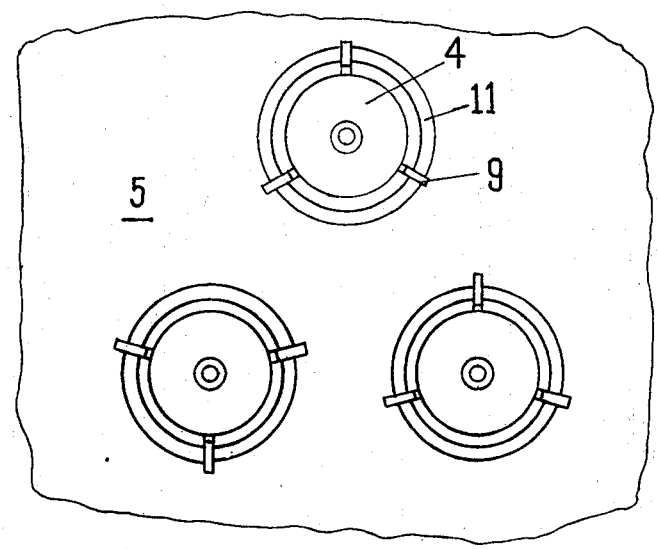
FIG.5

DEVICE FOR PERFORMING CATALYTIC ENDOTHERMIC REACTIONS

CROSS REFERENCE TO RELATED APPLICATION

This application constitutes a continuation-in-part of application, Ser. No. 179,788, filed Sept. 13, 1971 of Hans-Dieter Marsch, entitled DEVICE FOR PERFORMING CATALYTIC ENDOTHERMIC REACTIONS, now abandoned.

BACKGROUND OF THE INVENTION

The present invention relates to a pressure vessel with catalyst-filled reaction tubes for the reforming of gaseous hydrocarbons, particularly of naphtha or natural gas, mixed with steam, at pressures above 5 atm.g. in the pressure vessel and in the reaction tubes and at temperatures in excess of 700°C, said reaction tubes being heated with heating gas, this process being known under the term Steam Reforming.

Such catalytic reactions require devices in which the endothermic reaction is maintained by indirect heat exchange while the pressure load on the catalyst-filled tubes is lowered and thermal expansion of equipment components does not affect the operation of the device. Hydrocarbons, such as naphtha or natural gas, are commonly reformed, after admixture of steam, by reactions at elevated temperatures and elevated pressure in a device where a catalyst is present. The reaction product is a mixture of hydrogen, oxides of carbon, and methane. This mixture is used, for example, for the production of ammonia, methanol, city gas, or pure hydrogen. Known devices consist of an atmospheric combustion chamber with a multitude of catalyst-filled vertical reaction tubes. The hydrocarbons to be reformed, mixed with steam, pass into these tubes at a pressure of more than 5 atm.g. The hydrocarbons are reformed by an endothermic reaction, and the reaction gas leaves the device through a header. The reaction tubes are heated by firing with burners which are arranged, depending on the design of the furnace, in the ceiling or in the side walls and which operate at atmospheric pressure. Temperatures in excess of 700°C are required to achieve the reaction conditions in the reaction tubes. The temperatures in the combustion chamber are in the range from approximately 900° to 1400°C.

To reduce the high load on the tube wall which is attributable to the high temperatures and the pressure difference of normally 10 to 40 atm. it is also known to apply heating under pressure. In this case, the pressure in the heating space is either at the same level as the reaction pressure or may be slightly lower or higher. Heating can be performed in that the heating gas is produced either inside the pressure combustion chamber or outside the chamber with the gas, in the latter case, being allowed to pass through the chamber for heat transfer. Known devices as outlined, for example, in OS No. 1,802,505 for the passage of heating gas consist of a pressure vessel with internal insulation, a central heating gas tube with numerous apertures in the tube wall, and catalyst-filled reaction tubes with one closed end and an inserted thin gas outlet tube. The gas outlet tube reaches almost to the closed end of the reaction tube. Reaction tubes and gas outlet tubes are each held by a tubesheet which must be sealed against each other. Because of the difficulty to achieve uniform heating gas distribution and a perfect seal between the two tubesheets, pressure vessels of known design are suitable for moderate diameters only. Several devices are needed for big gas volumes of, for example, 80,000 Nm³/h and more. If leakage occurs on one or more tubes because of the high operating temperatures, the affected tube cannot be shut off; consequently, process gas will mix with the heating gas. In addition, the design using inserted tubes features an unfavorable temperature profile, particularly at part loads. This affects adversely the endothermic reaction. Moreover, pressure vessels with tubesheets have the disadvantage that in the case of sudden pressure differences caused by pressure drops on the product side, the tubesheets are subject to high loads.

SUMMARY OF THE INVENTION

The object of the invention is to provide a pressure vessel for catalytic endothermic reactions, said pressure vessel being designed for producing big volumes of gas, for example 80,000 Nm³/h or more, while incorporating an optimum heating gas flow for the endothermic reaction and avoiding the use of tubesheets for the reaction tubes.

According to the invention, the problem is solved by providing in the upper part of the internally insulated pressure vessel a supporting plate for shell tubes and reaction tubes, said plate fitting closely to the vessel wall to form a gastight seal and being attached to the top head of the vessel by means of tie rods. The supporting plate has a multitude of round apertures, and shell tubes with internal centering fins are seal-welded into said openings. The shell tubes are open at both ends and have their free end projecting into the lower part of the pressure vessel. Individual catalyst-filled reaction tubes are arranged in these shell tubes so that an annular space is obtained between shell tube and reaction tube, the length of the shell tube being normally equal to the height of the catalyst fill. The reaction tubes rest on the supporting plate by means of lugs, and the upper ends of the reaction tubes are connected to catalyst-free gas feed tubes which are grouped for passage across pressure vessel nozzles. The lower ends of the reaction tubes are connected to catalyst-free gas discharge tubes, which terminate in gas headers. The gas headers penetrate through the top head of the vessel into external nozzles.

If the process gas leaving the reaction tubes is not intended to undergo further reaction at approximately the same temperature level in another reaction vessel, but is going to be cooled, the invention provides a further solution to the problem. A supporting plate for the shell tubes is arranged in the upper part of the internally insulated pressure vessel, and fits closely to and provides a gastight seal with the vessel wall. The plate is attached to the top head of the vessel by means of tie rods, and has a plurality of round apertures. Shell tubes with internal centering fins are seal-welded into such apertures, and are open at both ends with the free ends projecting into the lower part of the pressure vessel. Individual catalyst-filled reaction tubes are arranged in these shell tubes so that an annular space is obtained between a shell tube and a reaction tube. The length of the shell tube is normally equal to the height of the catalyst fill. The reaction tubes rest on the bottom of the reaction vessel, and their upper ends are connected to catalyst-free gas feed tubes which are grouped for passage across pressure vessel nozzles. The lower ends of the reaction tubes are connected to catalyst-free gas discharge tubes, which penetrate individually and without mechanical contact through the bottom head of the pressure vessel and are sealed by means of welded caps. The gas discharge tubes serve as heat exchange tubes in the heat exchanger vessel outside the pressure vessel, said heat exchanger vessel being attached to the lower end of the pressure vessel. The bottom head of the pressure vessel at the same time provides the upper wall of the heat exchanger vessel, the heat exchanger vessel being provided with inlet and outlet nozzles for the cooling fluid.

If the feed gas mixture in the reaction vessel is intended to be preheated with heating gas, the invention provides another solution to the problem. A supporting section for shell tubes is attached in the upper part of the vessel to the vessel wall to form a gastight seal. The supporting plate of the supporting section is arranged above the reaction tubes and has a multitude of round apertures, the shell tubes with internal centering fins being sealwelded into these apertures. The shell tubes are open at both ends, the lesser portion of the shell tube lengths surrounding the coiled gas feed tube while the greater portion of the shell tube lengths surrounds the catalyst-filled reaction tube. The catalyst filled reaction tubes are arranged individually in the shell tubes to obtain an annular space between a shell tube and a reaction tube, the shell tube length along the reaction tubes being normally equal to the height of the catalyst fill. The reaction tubes rest on the bottom of the pressure vessel, their upper ends are connected to catalyst-free gas feed tubes, which are coiled in the upper part of the shell tubes and are grouped downstream of the shell tubes for passage across pressure vessel nozzles. The lower ends of the reaction tubes are connected to catalyst-free gas discharge tubes, which penetrate individually and without mechanical contact through the bottom head of the pressure vessel and are sealed by means of welded caps. The gas discharge tubes serve as heat exchange tubes in the heat exchanger vessel outside the pressure vessel, said heat exchanger vessel being attached to the lower end of the pressure vessel. The bottom head of the pressure vessel at the same time provides the upper wall of the heat exchanger vessel, which is provided with inlet and outlet nozzles for the cooling fluid.

The connection between the supporting plate and the tie rod is designed to permit dismantling from the outside access openings of the reaction vessel through nozzles conveniently located on the circumference of the vessel. Bars in pairs are inserted through these access openings to support the weight of the reaction tubes during assembly and any suitable hydraulic means is employed to effect lifting of the bars.

The external portions of the gas feed tubes and/or the gas discharge tubes can be equipped with shut-off valves to take individual reaction tubes out of service.

The invention incorporates the particular advantages that a multitude of reaction tubes can be arranged in an internally insulated pressure vessel and that the use of space-consuming gas return lines for process gas and heating gas as are necessary in a pressure vessel with insertion-type double tubes, is avoided. Routing the heating gas along the reaction tubes by means of shell tubes is uncomplicated and uniform with reference to the circumference and length of the reaction tubes. Thermal expansions are either substantially compensated through their unidirectional effect and/or absorbed by the gas feed tubes and gas discharge tubes, the gas feed tubes at least being arranged inside the pressure vessel. Through the countercurrent flow of feed gas mixture and heating gas and through the arrangement of a defined length of the gas feed tubes in the reaction free upper part of the pressure vessel, it is possible to achieve a preheating of the feed gas mixture and, consequently, a further utilization of the thermal energy of the heating gas. If the product is intended to be cooled after leaving the reaction tubes, the compact design incorporating an attached heat exchanger makes it possible to achieve additional cooling of the pressure vessel bottom.

BRIEF DESCRIPTION OF THE DRAWINGS

Examples of application of the invention are illustrated on the attached drawings which represent:

FIG. 2 is a cross-sectional fragmentary view of the reaction vessel shown in FIG. 1, above the supporting plate;

FIG. 3 is a cross-sectional fragmentary view of the reaction vessel shown in FIG. 1, below the supporting plate and the lower ends of the shell tube;

FIG. 4 is a fragmentary sectional elevation of the supporting plate, shell tubes, and reaction tubes with supporting lugs;

FIG. 5 is a plan view of a fragment of the supporting plate, on an enlarged scale;

DESCRIPTION OF THE PREFERRED EMBODIMENTS

Figure 1:
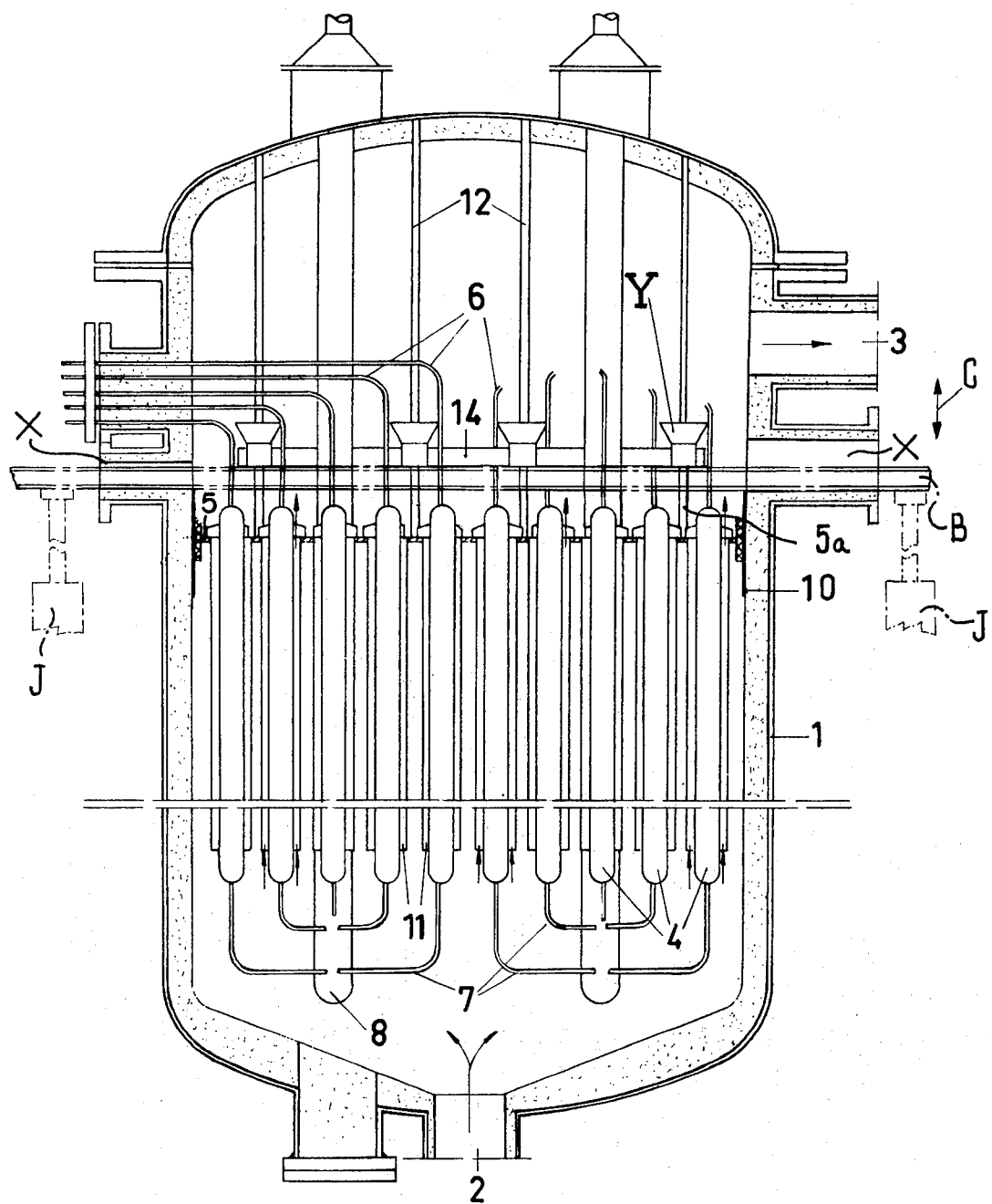
FIG. 1 is a sectional elevation of a reaction vessel with freely suspended reaction tubes.

As shown in FIG. 1, the internally insulated pressure vessel 1 has a heating gas inlet nozzle 2 and an outlet nozzle 3 and accommodates a plurality of reaction tubes 4 suspended from a transverse supporting plate 5. The reaction tubes 4 are filled with a catalyst, and their inlet ends are connected to feed tubes 6 for the feed gas mixture while the outlet ends are connected to discharge tubes 7 for the process gas. Groups of feed tubes 6 are routed to leave the vessel through nozzles and are connected to an external line, which is not shown. The discharge tubes 7 are connected in a star-like pattern to several headers 8 which penetrate through the top head of the pressure vessel. The fixed points of the headers are located in the top head of the pressure vessel, and, as a consequence, expansion at high temperatures is directed towards the bottom of the pressure vessel. The upper ends of the reaction tubes 4 are provided with welded supporting lugs 9 (see FIG. 4) which rest on the upper face of the supporting plate 5. The diameter of the supporting plate 5 is approximately equal to the inside diameter of the pressure vessel 1. Sealing between the internally insulated vessel wall, which is provided with a slide plate 10, and the supporting plate 5 is achieved by means of known seal designs. The supporting plate apertures provided for the passage of the reaction tubes accommodate the shell tubes 11 which extend freely into the lower part of the pressure vessel. The length of the shell tubes is normally equal to the height of the catalyst fill in the reaction tubes 4. With regard to their inside and outside diameter, respectively, reaction tubes 4 and shell tubes 11 are sized to leave an annular space between them through which the heating gas from the lower part of the pressure vessel passes countercurrently to the flow of gas inside the reaction tubes into the upper part of the pressure vessel. Centering fins 11a are provided on the shell tubes 11 to obtain a uniform annular space. The weight of the supporting plate 5 with the sealwelded shell tubes 11 and the reaction tubes 4 suspended from the supporting plate and installed in the shell tubes is transferred through tie rods 12 to the top head of the vessel 1. Double eyelets 13 in the split-type tie rods 12 and a cross rod 14 enable separating the vessel top head and the supporting plate 5 and opening the vessel. The supporting plate 5 is held in place by means of hydraulic jacks J.

FIG. 2 shows the location of the reaction tubes 4 with respect to a header. The pitch for the shell tubes in supporting plate 5 is held as small as possible to reduce the dead space between adjacent shell tubes. This design provides for optimum utilization of the diameter of the pressure vessel.

As shown in FIG. 3, the gas discharge tubes 7 in the lower part of the pressure vessel are routed in a starlike pattern to the various gas headers 8. A uniform spacing of the reaction tubes on the gas headers is not necessary. The pressure drop in the catalyst-filled reaction tubes 4 is higher than the pressure drop in the catalyst-free discharge tubes so as to ensure a uniform gas distribution upon the reaction tubes. FIG. 4 and FIG. 5 show constructional details of supporting plate 5, shell tubes 11, reaction tubes 4 with supporting lugs 9, viz. a cross-sectional view and a plan view.

Figure 6:
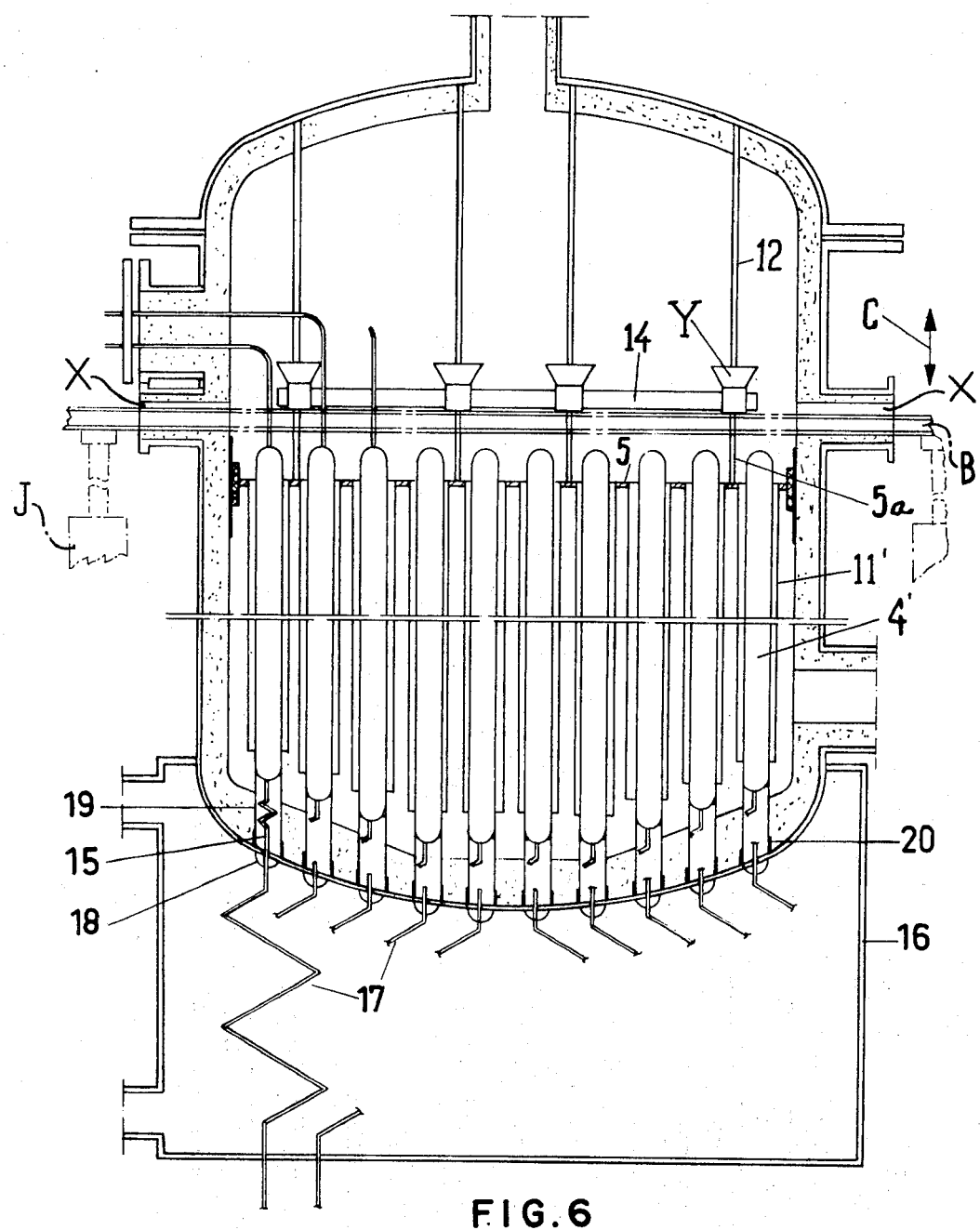
FIG. 6 is a sectional elevation of a reaction vessel with supported reaction tubes and attached heat exchanger.

FIG. 6 shows another example of application in which the reaction tubes 4 are not provided with supporting lugs 9 because they are not carried by the supporting plate 5. The only purpose of the supporting plate 5 with the sealwelded shell tubes 11 is to divide the pressure vessel into two compartments and to direct the heating gas through the shell tubes. Similar to the design shown in FIG. 1, the supporting plate 5a is sealed against the internally insulated vessel wall. The reaction tubes 4' in the shell tubes 11' rest on the bottom of the pressure vessel. Gas discharge tubes 15 penetrate individually through the bottom head of the vessel and serve as heat exchange tubes 17 in the attached heat exchanger 16. The cooling fluid in the heat exchanger which may serve, for example, as feedwater preheater or vaporizer, cools at the same time the bottom of the pressure vessel. According to FIG. 7, gas discharge tube 15 is free to expand between reaction tube 4' and welded sealing cap 18. The reaction tube 4' rests on supporting sleeve 19 which is held in position through centering ring 20 welded to the bottom.

The temperature of the thin-walled sealing cap 18 and the supporting ring 20 to the bottom is held at a moderate level through the cooling fluid. The reaction tubes 4' are subject to thermal expansion in an upward direction. The gas feed tubes 21 are installed to absorb the expansion of the reaction tubes 4'.

Figure 7:
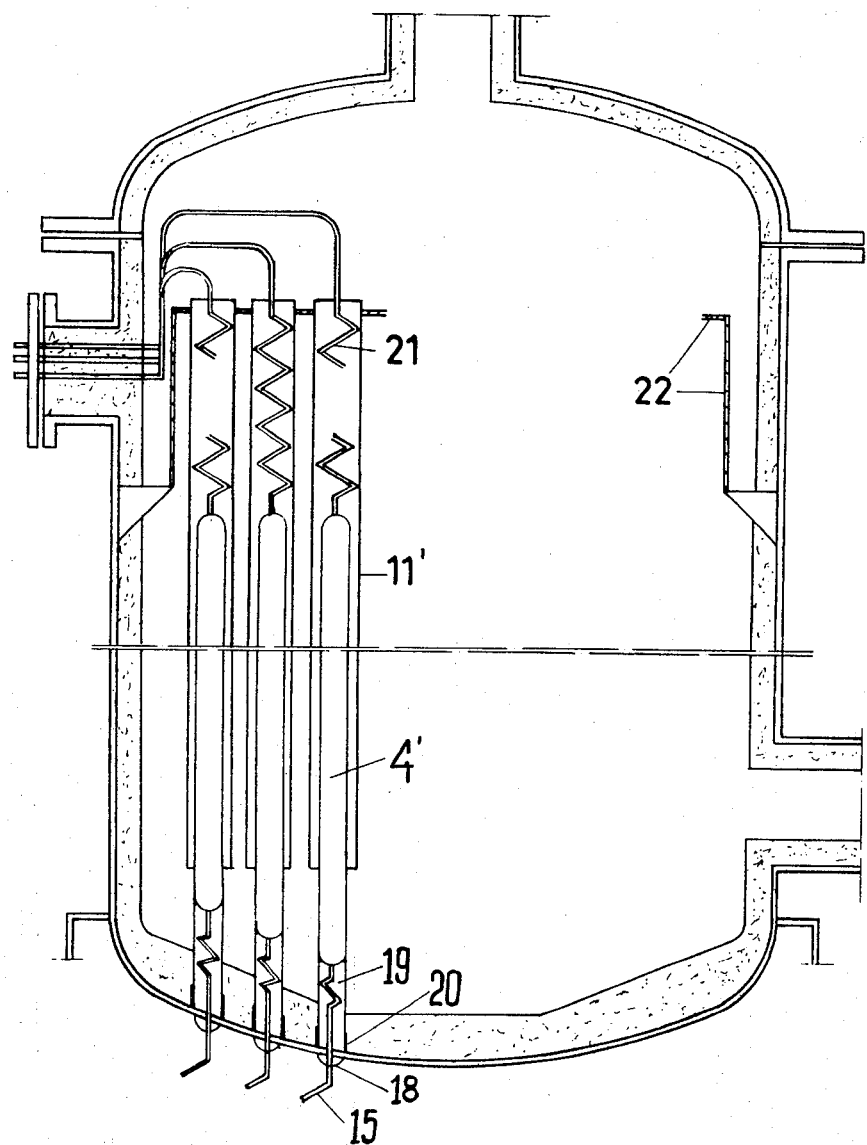
FIG. 7 is a sectional elevation of a reaction vessel with preheating zone, some parts being broken away.

According to FIG. 7, the upper end of the shell tubes 11' extend beyond the reaction tubes 4'. The gas feed tubes 21 are arranged in the extended shell tubes 11' in such a way, for example, coiled, that the feed gas mixture is preheated. In this way, the thermal energy of the heating gas is further utilized. The supporting section 22 with the supporting plate for the shell tubes is preferably fixed to the vessel wall.

As shown in FIG. 6, the gas discharge tubes 15 penetrate individually through the bottom head of the vessel and serve as heat exchanger tubes in heat exchanger 16.

Figure 8:
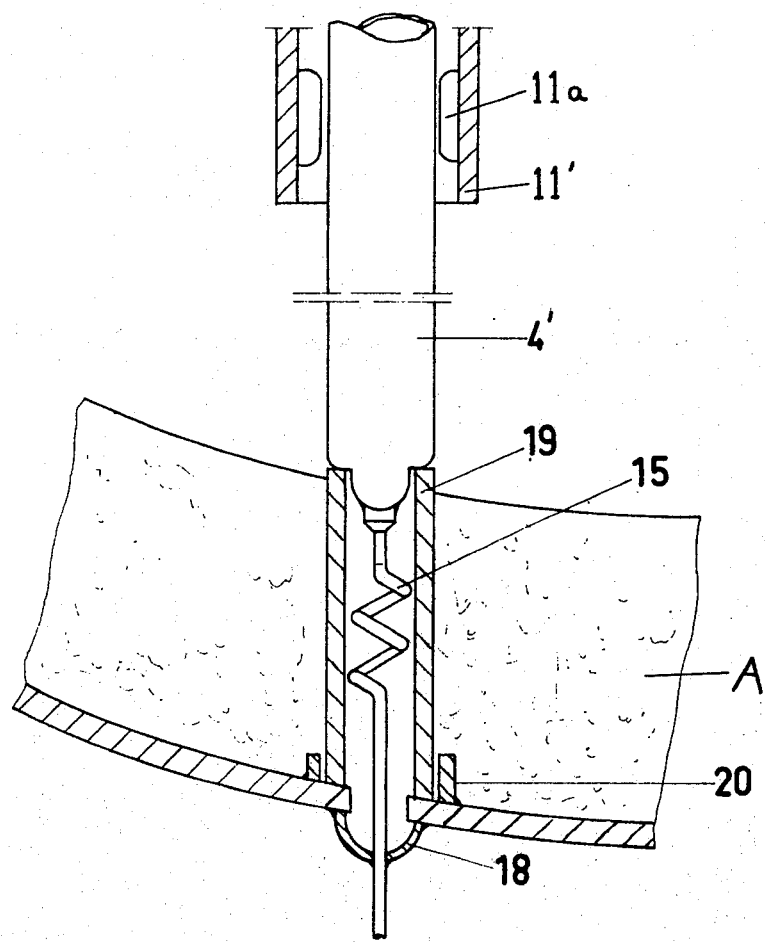
FIG. 8 is a fragmentary sectional elevation on an enlarged scale of a reaction tube support shown in FIG. 6.

Referring to FIG. 8, the supporting sleeve 19 for reaction tube 4' projects beyond the insulation A of the bottom head of the pressure vessel. Whenever a reaction tube must be replaced, it can be withdrawn from the pressure vessel in an upward direction without damage to the internal insulation of the pressure vessel. The sealing cap 18 is previously separated from the gas discharge tube 15.

Figure 9:
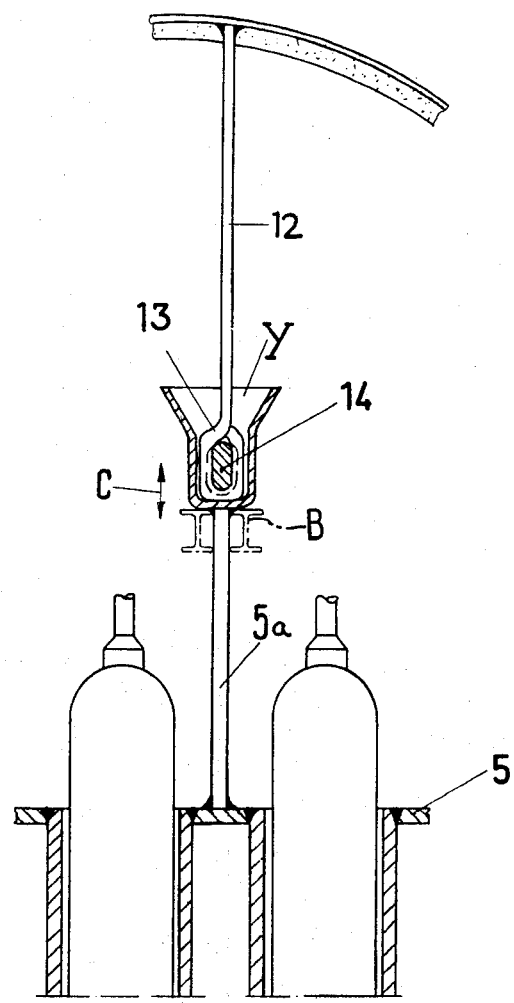
FIG. 9 is a sectional elevation of a detachable suspension of a tie rod and supporting plate.

When it is intended to remove the pressure vessel top head which carries supporting plate 5 as shown in FIGS. 1 and FIG. 6, the supporting plate is lifted according to FIG. 9 by introducing common support devices from the outside so that the cross rod 14 can be withdrawn. Such common support devices may consist of a pair of bars or I beams shown at B on FIGS. 1, 6 and 9 by broken lines as extending through access openings X in the outer wall of the vessel. The bars B are arranged on opposite sides of and beneath funnel-like covers Y which are fixed to rods 5a and by suitable hydraulic jack means J the bars are lifted slightly as indicated by the arrows C. Each of the rods 5a and 12 has an eyelet 13 which can register with each other as shown on FIG. 9, to receive a cross rod 14. By supporting the reaction tube assembly by the pair of bars B, the cross rod 14 can be removed so that the top head of the pressure vessel can be removed. Any suitable lifting power can be employed, such, for example as hydraulic jacks J at opposite ends of the bars b.

What I claim is:

1. A device for the reforming of gaseous hydrocarbons mixed with steam by a heating gas, said hydrocarbons and heating gas being under pressure of more than 5 atm.g. comprising in combination a vertically disposed internally insulated pressure vessel, a supporting plate in the upper portion of said vessel in essentially gastight connection with the inner insulated wall thereof, said supporting plate having a plurality of apertures, heating gas inlet and outlet means for said vessel, open ended shell tubes fitting said supporting plate apertures respectively, and seal welded therein to be supported by said plate, and having their lower ends disposed in the lower part of said vessel, a catalyst-containing reaction tube in each shell tube and spaced from the walls thereof to enable passage of heating gas therethrough, means for supporting said reaction tubes on said supporting plate and within said shell tubes, catalyst-free gas feed tubes extending to the upper inlet ends of said reaction tubes, and catalyst-free gas discharge tubes connected to the lower ends of said reaction tubes.

2. A device as claimed in claim 1, characterized in that lugs connected to said reaction tubes rest on the upper face of said plate and constitute means for supporting the reaction tubes.

3. A device as claimed in claim 1, characterized in that said gas discharge tubes penetrate individually and without mechanical contact through the bottom head of said vessel, welded caps securing each tube to said vessel, means providing a heat exchanger vessel outside of said pressure vessel and through which said discharge tubes extend to serve as heat exchanger tubes, the bottom head of said pressure vessel providing the upper wall of said heat exchanger vessel, and means providing inlet and outlet nozzles for cooling fluid in said heat exchanger vessel.

4. A device as claimed in claim 3, characterized in that said supporting plate is arranged above the reaction tubes, said catalyst-free gas feed tubes are connected to the upper ends of said reaction tubes are coiled in the upper part of said shell tubes.

5. A device as claimed in claim 3, characterized in that a sleeve is provided as a rest for the lower end of each reaction tube, the lower end of said sleeve bearing against the bottom head of said pressure vessel, and a centering ring secured to the pressure vessel for holding each sleeve in position, the gas discharge tubes extending through said sleeves respectively.

6. A device as claimed in claim 1, comprising tie rods connecting said supporting plate to the top of said vessel, each tie rod consisting of two sections provided with eyelets at the point of separation, a cross rod common to and extending through the pairs of eyelets, covers for said eyelets on the plate-connected rods, means for enabling assembly and disassembly of the structure including bars disposed transversely of the vessel on which said covers rest, there being access openings in said vessel through which said bars freely extend, and jack means for slightly raising said beams, thereby to enable insertion thereof and removal of said cross rods from said eyelets.

* * * * *